United States Patent [19]

Tamura et al.

[11] Patent Number: 4,703,190

[45] Date of Patent: Oct. 27, 1987

[54] POWER SUPPLY SYSTEM FOR A QUADRUPOLE MASS SPECTROMETER

[75] Inventors: Yoshikazu Tamura; Katsuo Kitajima, both of Fuchu, Japan

[73] Assignee: Anelva Corporation, Tokyo, Japan

[21] Appl. No.: 877,923

[22] Filed: Jun. 24, 1986

[30] Foreign Application Priority Data

Jun. 25, 1985 [JP] Japan ................................ 57-136856

[51] Int. Cl.[4] ................................................ H02J 1/00

[52] U.S. Cl. .......................................... 307/2; 307/87; 307/75; 250/292; 250/251

[58] Field of Search ...................... 307/1, 2, 3, 4, 5, 6, 307/7, 73, 75, 87; 324/316, 317, 318, 320, 321, 322; 328/155; 356/326, 327, 328, 302, 319, 343, 308; 250/292, 251, 300, 281, 343; 331/183, 112, 106, 108 C, 109, 101 T, 110, 182, 184, 185, 186

[56] References Cited

U.S. PATENT DOCUMENTS

| | | | |
|---|---|---|---|
| 3,495,186 | 2/1970 | Wright | 331/183 X |
| 3,621,464 | 11/1971 | Bryndza | 250/292 X |
| 3,641,340 | 2/1972 | Grinten et al. | 250/292 |
| 3,735,287 | 5/1973 | Lowe | 250/292 X |
| 3,784,814 | 1/1974 | Sakai et al. | 250/292 X |
| 3,838,280 | 9/1974 | Klein et al. | 250/292 |
| 3,946,229 | 3/1976 | Moseman et al. | 250/292 |
| 4,066,894 | 1/1978 | Hunt et al. | 250/292 |
| 4,074,936 | 2/1978 | Grisar et al. | 356/303 X |
| 4,092,069 | 5/1978 | Fukuda et al. | 356/325 |
| 4,111,556 | 9/1978 | Grisar et al. | 356/303 X |
| 4,136,280 | 1/1979 | Hunt et al. | 250/292 |
| 4,144,463 | 3/1979 | Sugiura | 307/75 |
| 4,506,227 | 3/1985 | Heinen et al. | 250/292 X |
| 4,609,870 | 9/1986 | Lale et al. | 331/109 X |

*Primary Examiner*—William M. Shoop, Jr.
*Assistant Examiner*—Shik Luen Paul Ip
*Attorney, Agent, or Firm*—Pollock, VandeSande & Priddy

[57] ABSTRACT

A power supply system for a quadrupole mass spectrometer includes an RF (radio frequency) power source for generating RF voltages and a voltage divider functioning as a DC (direct current) voltage generating circuit. This voltage divider divides the RF voltages and then rectifies them so as to derive DC voltages while maintaining a proportional relationship to the RF voltages. Thereafter, the DC voltages are superimposed on the RF voltages. The resultant voltages are applied to the electrodes of the quadrupole mass spectrometer.

6 Claims, 8 Drawing Figures

POWER SUPPLY SYSTEM FOR A QUADRUPOLE MASS SPECTROMETER

BACKGROUND OF THE INVENTION

1. Field of the Invention

The present invention relates to a power supply system for a quadrupole mass spectrometer wherein DC voltages are superimposed on radio frequency (RF) voltages as supply voltages for quadrupole electrodes.

2. Description of Prior Art

In general, a quadrupole mass spectrometer requires, due to its inherent characteristic, supply voltages for its four hyperbolic or cylindrical electrodes, which have been obtained by superimposing DC (direct current) voltages on RF (radio frequency) voltages, so as to spectro-analyze the mass of a sample.

A typical prior art power supply system for a quadrupole mass spectrometer is shown in FIG. 1. In this power supply system, the DC voltages ($\pm$U) are superimposed on the RF voltages ($\pm$V cos $\omega$t) to obtain the superimposed supply voltages ($\pm$[U+V cos $\omega$t ]). "U" and "V" denote amplitudes of the DC voltages, and RF voltages respectively, whereas "$\omega$" indicates an angular velocity and "t" represents a time.

This conventional power supply system is known from, for instance, "QUADRUPOLE MASS SPECTROMETRY and its applications" issued by ELSEVIER SCIENTIFIC PUBLISHING COMPANY, AMSTERDAM, THE Netherlands, 1976 by Peter H. Dawson, pages 147, 282 and 295 (see FIGS. 6.19, 11.3, and 12.9).

Operations of the voltage superposition of this power supply system will now be summarized with reference to FIG. 1. In this conventional power supply system, an oscillator 31 produces a reference signal which is supplied to an RF (radio frequency) voltage generator 32. In synchronism with the reference signal produced in the oscillator 31, an RF voltage ($\pm$V cos $\omega$t) is applied to a superposition circuit 33. Meanwhile a DC voltage generator 35 produces DC voltages $\pm$U corresponding to an RF voltages derived from a detection circuit 34 (amplitudes of the RF voltage subdivided from the above RF voltages $\pm$V cos $\omega$t) and applies these DC voltages to the superposition circuit 33. Then the superposition circuit 33 superposes the RF voltages on the DC voltages to obtain superimposed voltages $\pm$(U+V cos $\omega$t) which are applied to the electrodes of the quadrupole mass spectrometer 36.

To implement the mass analysis of a sample, ions that are generated from an ion source 37 and to be mass-analyzed are incident upon the quadrupole mass spectrometer 36; a sawtooth wave scanning signal is supplied from a control section 40 to, e.g., the RF voltage generator 32, and the amplitudes of the RF voltages ($\pm$V cos $\omega$t) to be applied to the quadrupole mass spectrometer 36 are scanned by the sawtooth wave signal under control of the control section 40. In this case, a negative feed-back path in a circuit arrangement constructed by a comparator 41, the RF voltage generator 32 and the detection circuit 34 is usually formed. In this arrangement the DC voltages derived from the detection circuit 34 are superimposed over the scanning signal in the comparator 41. Accordingly, an ion having a predetermined mass number passes through a quadrupole mass spectrometer 36 and is then detected in a detector 38 in synchronism with the scanning signal and finally recorded on a recorder 39 as a mass spectrum.

What kind of the ion can be analyzed by analyzing this mass spectrum.

As seen from the circuit diagram of FIG. 1, the DC voltages $\pm$U and the RF voltages $\pm$V cos $\omega$t are separately produced; and thereafter these voltages are superimposed over each other in the superposition circuit 33 so as to generate the desirable analyzing voltages $\pm$(U+V cos $\omega$t), which are applied to the quadrupole mass spectrometer 36 according to the conventional quadrupole mass spectrometer power supply system. As a result, at least two separate power sources are required to produce the RF voltages $\pm$V cos $\omega$t and the DC voltages $\pm$U.

Moreover, the DC voltages $\pm$U must be adjusted to desirable voltages in order to achieve the optimum conditions for the mass spectro-analysis. FIG. 2 shows a conventional controllable DC power supply system. This power supply system employs a positive power source (e.g. +350 V), a negative power source (e.g. −350 V), and two transistors $TR_1$ $TR_2$ and desired DC voltages $\pm$U are generated in response to the input signal. Accordingly, power supply sources having higher voltages than the desirable maximum DC voltages are necessary. For instance, both positive and negative power sources capable of applying several hundreds of DC voltages are required. In addition, high-voltage controlling transistors are required, resulting in a complex power supply system. This prior art controllable DC power supply system is known from e.g., the quadrupole mass spectrometer, Model AQA-360, ANELVA Corporation, Japan.

An object of the Invention is to prevent the above-described drawbacks of the conventional power supply system, and therefore to provide a power supply system for a quadrupole mass spectrometer without requiring separate DC power sources. Moreover, the power supply system produces the DC voltages ($\pm$U) having a specific relation to the RF voltage by processing the RF voltages ($\pm$V cos $\omega$t), thereby deriving desirable analyzing voltages $\pm$(U+V cos $\omega$t.)

SUMMARY OF THE INVENTION

These objects of the invention can be accomplished by providing a power supply system for a quadrupole mass spectrometer comprising:

means for generating RF (radio frequency) voltages;

means for dividing the RF voltages to produce subdivided RF voltages;

means for detecting the RF voltages to produce a detected voltage;

means for generating DC (direct current) voltages from the subdivided RF voltages obtained by said RF voltage dividing means in such a manner that said subdivided RF voltages are rectified under control of the detected voltage with maintaining a proportional relationship between the detected voltage and the resultant DC voltages; and means for superimposing the resultant DC voltages over the RF voltages generated by said RF voltage generating means so as to apply the superimposed voltage to the quadrupole mass spectrometer.

BRIEF DESCRIPTION OF THE DRAWINGS

For better understanding of these and other objects of the present invention, reference is made to the following detailed description of the invention to be read in conjunction with the following drawings, in which.

DETAILED DESCRIPTION OF PREFERRED EMBODIMENT

BASIC IDEA

The present invention is achieved from the following recognition. The RF (radio frequency) voltages ±V cos ωt to be applied to the quadrupole mass spectrometer are first divided into sub-divided RF voltages. The sub-divided RF voltages are secondly rectified to derive DC voltages. These DC voltages are applied as the desirable DC voltages ±U to the quadrupole mass spectrometer. Specific controlling is effected to correspond DC voltages ±U to the amplitudes of the RF voltages ±V cos ωt, so that the desirable supply voltages ±(U+V cos ωt) can be produced with a simpler circuit arrangement.

For a better understanding of the above recognition, a description will now be made of the basic idea of the present invention with reference to FIG. 3.

Figure 1:
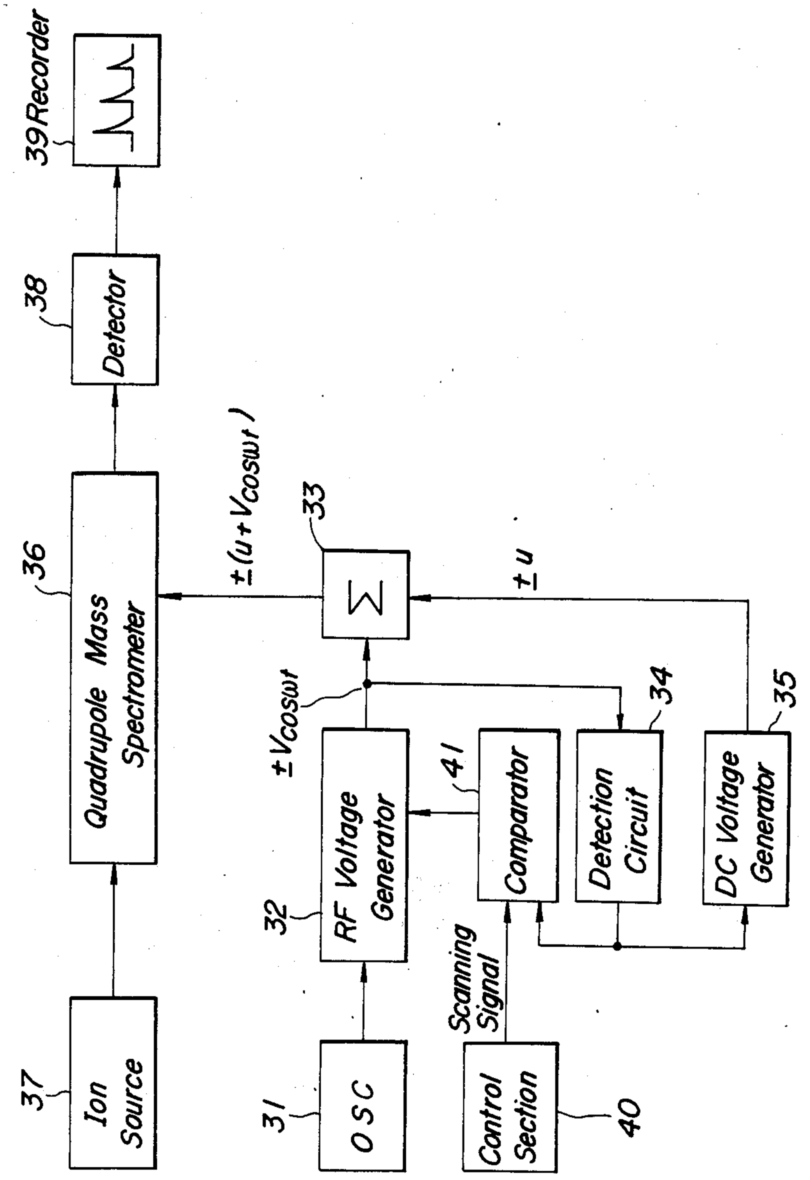
FIG. 1 PRIOR ART
FIG. 1 is a schematic block diagram of the conventional power supply system for a quadrupole mass spectrometer.
Figure 2:
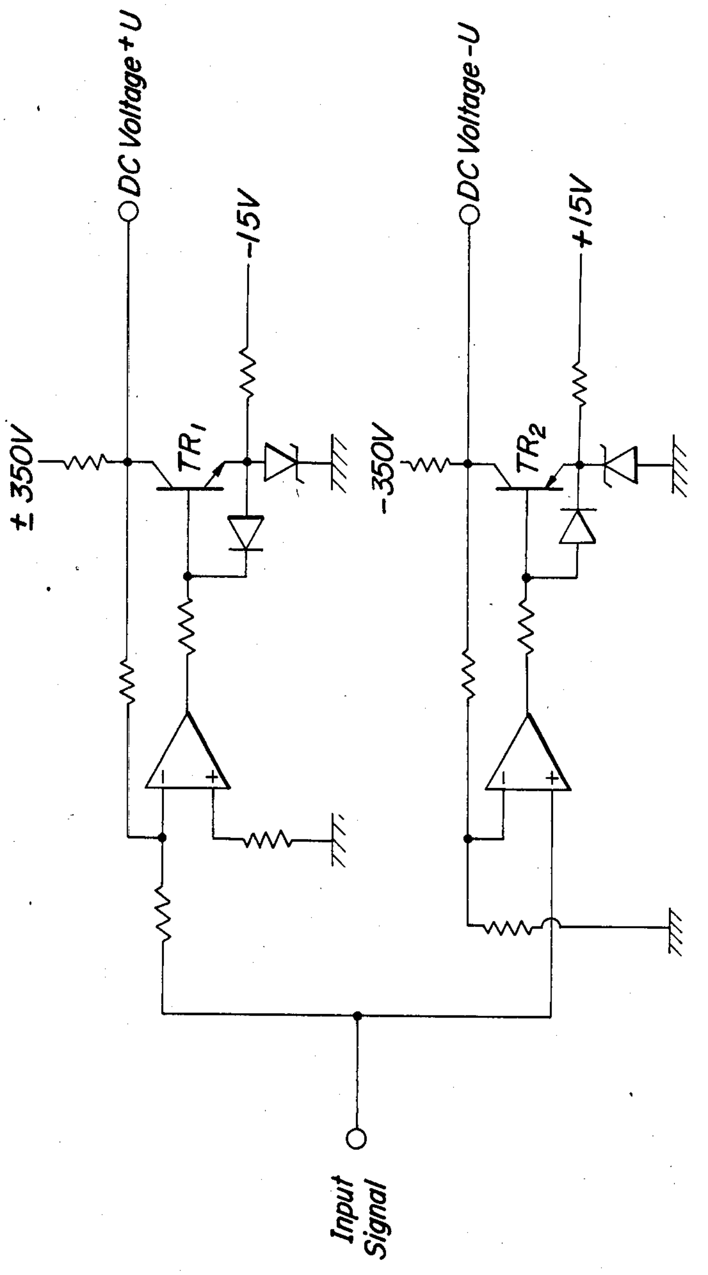
FIG 2 PRIOR ART
FIG. 2 is a circuit diagram of the conventional controllable DC power source.
Figure 3:
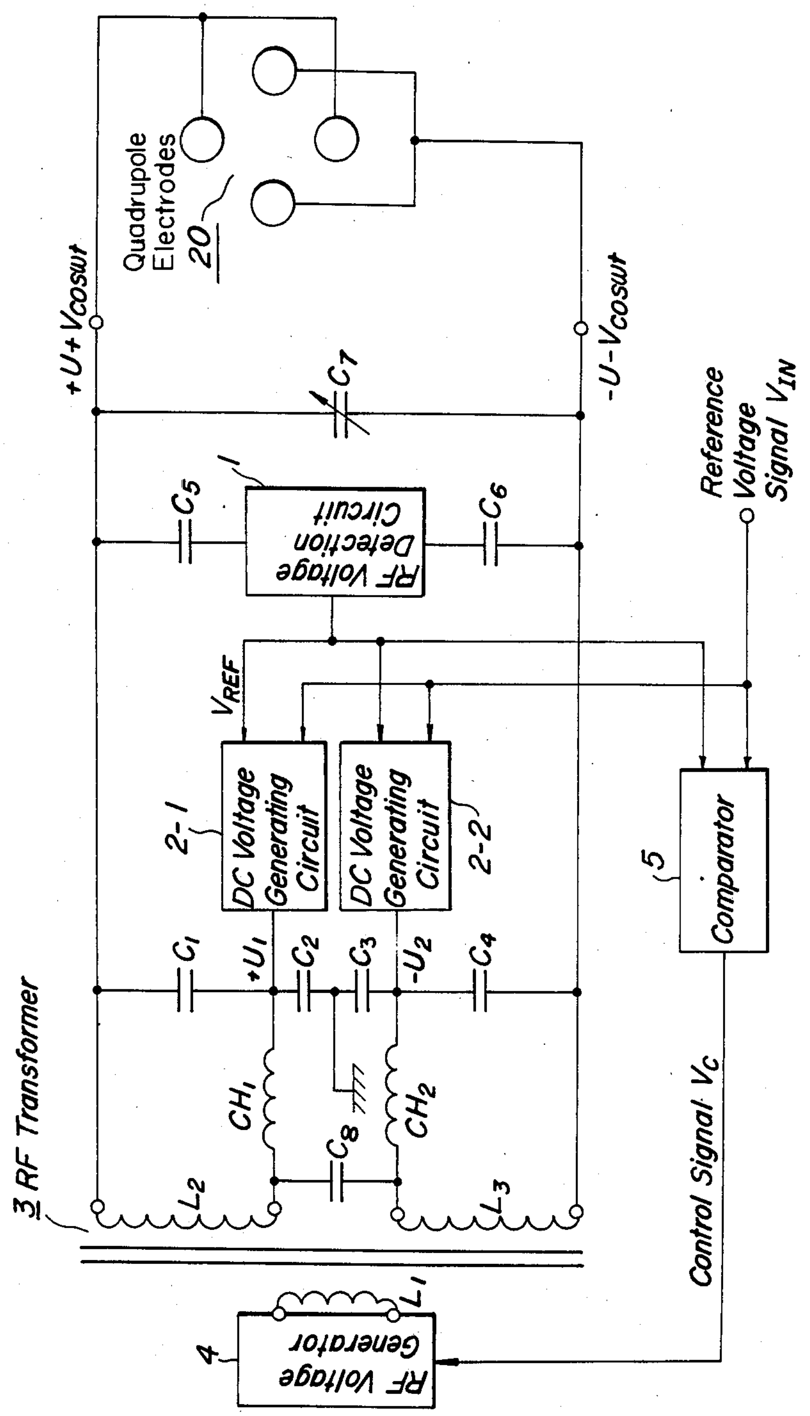
FIG. 3 is a schematic block diagram of a basic idea of a power supply system for a quadrupole mass spectrometer according to the invention.

FIG. 3 is a schematic circuit diagram of a power supply system for explaining the basic idea of the invention. The power supply system includes an RF (radio frequency) voltage detection circuit 1, two sets of DC voltage generating circuits 2-1 and 2-2, an RF transformer 3, an RF voltage generator 4, a comparator 5, capacitors $C_1$ to $C_8$, inductors or coils $L_1$ to $L_3$, choke coils $CH_1$ and $CH_2$ and quadrupole electrodes 20.

It should be noted that RF voltages ±V cos ωt are generated from the RF voltage generator 4, and are induced at secondary windings, i.e., the inductors $L_2$ and $L_3$ of the RF transformer 3; and these RF voltages ±V cos ωt are superimposed on DC voltages ±U, whereby the desirable superposed voltages ±(U+V cos ωt) are applied to quadrupole electrodes 20 of the quadrupole mass spectrometer.

To the RF voltage detection circuit 1, the positive RF voltage component is supplied from the superposed positive voltage (U+V cos ωt) via the capacitor $C_5$, whereas the negative voltage (−U−V cos ωt) is supplied via the capactitor $C_6$. These RF voltage components are rectified by the RF voltage detection circuit 1 to derive a detected voltage $V_{REF}$ corresponding to summed amplitudes of these voltage components. It is also possible to derive another detected voltage $V_{REF}$ by rectifying one of these positive and negative RF voltage components, because the amplitude of the positive RF voltage component is substantially equal to that of the negative one.

The function of the DC voltage generating circuit 2-1 is first to rectify the RF voltage component across the capacitor $C_2$ and secondly to produce a DC voltage $+U_1$ across it. Thus generated DC voltage $+U_1$ maintains a proportional relationship with either a reference voltage $V_{IN}$ or the detected voltage $V_{REF}$ derived from the RF voltage detection circuit 1. Similarly, the other DC voltage generating circuit 2-2 causes another DC voltage $-U_2$ to be produced across the capacitor $C_3$ and the DC voltage $-U_2$ maintains a proportional relationship with the reference voltage $V_{IN}$ or the detected voltage $V_{REF}$ output from the RF voltage detection circuit 1.

The DC voltage $+U_1$ appearing across the capacitor $C_2$ is applied to the quadrupole electrodes 20 via a choke coil $CH_1$ and the inductor $L_2$. This DC voltage $+U_1$ constitutes the DC voltage component of the superposed voltage (U+V cos ωt). Similarly, the DC voltage $-U_2$ appearing across the capacitor $C_3$ is applied to the quadrupole electrodes 20 through a choke coil $CH_2$ and the inductor $L_3$. This DC voltage $-U_2$ constitutes the DC voltage component of the superimposed voltage (−U−V cos ωt).

In summary, the DC voltage generating circuits 2-1 and 2-2 are controlled by maintaining the proportional relationship between either the reference voltage $V_{IN}$ or the detected voltage $V_{REF}$ corresponding to the amplitudes of RF voltages (±V cos ωt) and the DC voltages $+U_1$, $-U_2$ appearing across the capacitors $C_2$,$C_3$. The reference voltage $V_{IN}$ is to produce predetermined RF voltages ±cos ωt, whereas the detected voltage $V_{REF}$ is generated by the RF voltage detection circuit 1. Accordingly, the desirable DC voltages ±U constituted by the finally desirable voltages ±(U+V cos ωt) supplied to the quadrupole mass spectrometer can be automatically produced from the RF voltages ±V cos ωt according to the invention. Also the proportional relationship can be kept between the DC voltages and the reference voltage, or the detected voltage, and furthermore the former voltages are superimposed on the reference voltage or the detected voltage.

FIRST EMBODIMENT

Referring now to a circuit diagram of FIG. 4, a power supply system according to a first embodiment will be described into which the above-described basic idea has been introduced.

It should be noted the same reference numerals shown in FIG. 3 will be employed as those for denoting the same circuit elements shown in the following figures.

Figure 4:
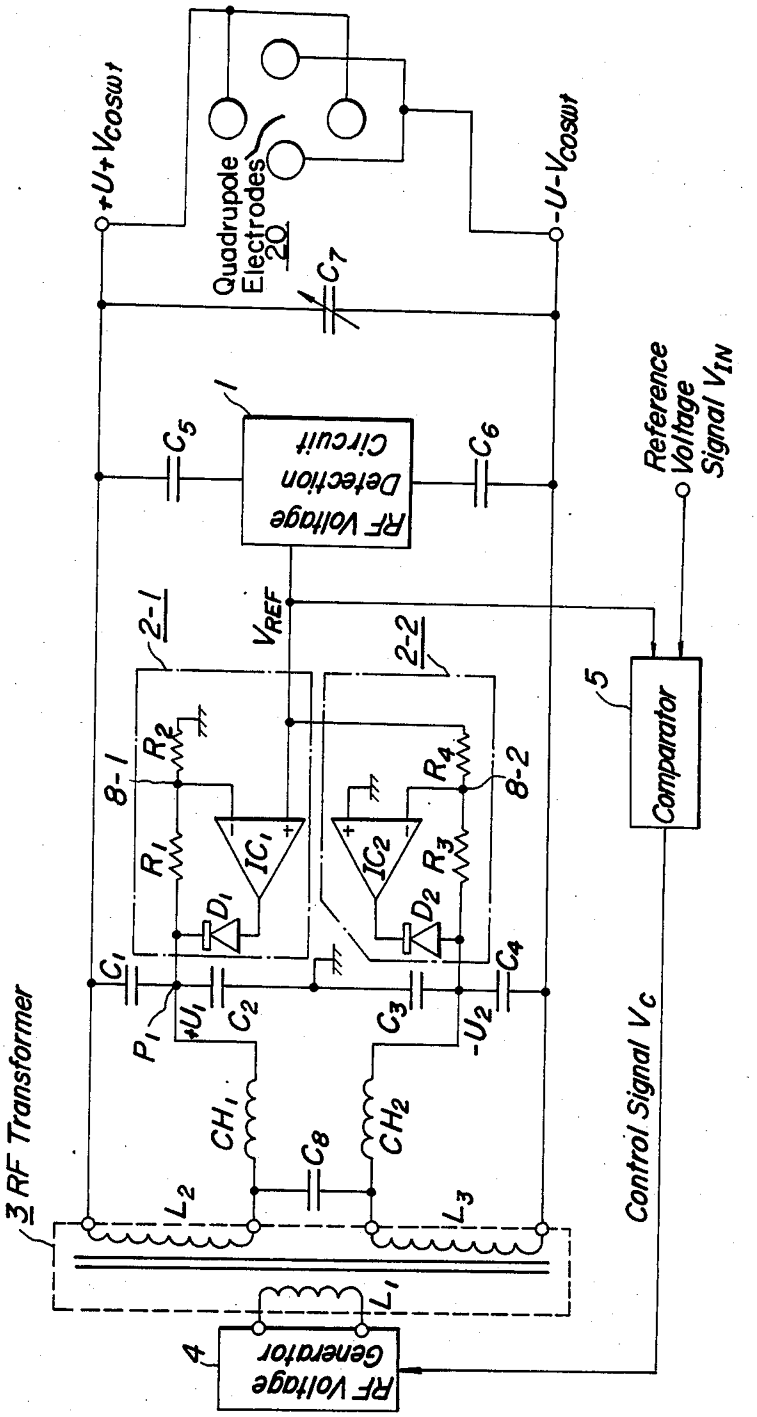
FIG. 4 is a schematic block diagram of a power supply system according to a first preferred embodiment.

In FIG. 4, the comparator 5 supplies the control signal $V_c$ to the RF voltage generator 4 in such a manner that the reference voltage $V_{IN}$ applied from an external circuit (not shown in detail) is equal to, e.g., the detected voltage $V_{REF}$ detected in the RF voltage detection circuit 1 (namely, a voltage corresponding to an amplitude of the RF voltage ±V cos ωt). As a result, the RF voltages applied from the RF voltage generator 4 to the RF transformer 3 are transformed into predetermined RF voltages ±V cos ωt so as to be applied to the electrodes 20 of the quadrupole mass spectrometer.

It should be noted that thus applied RF voltages ±V cos ωt are resonant under the condition that the capacitance between the electrodes 20 constituting the quadrupole mass spectrometer, the capacitance of the capacitor $C_7$, the inductance of the secondary winding of the RF transformer 3 and the like are involved. The adjustment of the resonance conditions may be performed by the variable capacitor $C_7$.

As seen from the circuit diagram of FIG. 4, the voltage (U+V cos ωt) is divided by the capacitors $C_1$ and $C_2$. The value of the DC voltage $+U_1$ appearing across the capacitor $C_2$ can be controlled to a given value by employing the diode $D_1$ constituting the DC voltage generating circuit 2-1. To explain in detail the concept of producing the DC voltage "$+U_1$" across the capacitor C2, circuits as shown in FIGS. 5A and 5B are referred.

Figure 5A:
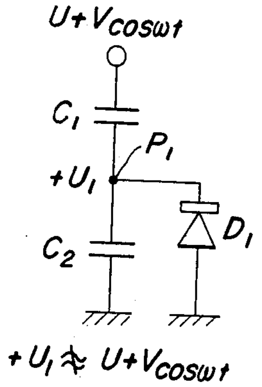
FIGS. 5A and 5B are illustrations for explaining the non-linearity problem of the voltage divider.
Figure 5B:
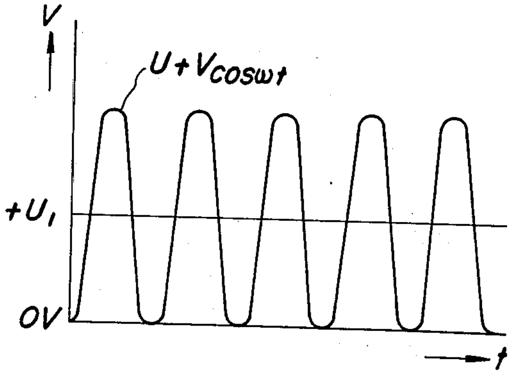

In FIG. 5A, the superimposed supply voltage (U+V cos ωt) is subdivided by the capacitors $C_1$ and $C_2$. The diode $D_1$ is connected between a junction, or voltage dividing point $P_1$ and ground with the polarity as shown. Then the DC voltage $+U_1$ appearing at the voltage dividing point $P_1$ is illustrated in FIG. 5B. Since the forward rectification characteristics of the diode $D_1$ are non-linear, the resultant DC voltage $+U_1$ is not proportional to the supplied superimposed voltage (U+V cos ωt).

Therefore, according to the invention, the power supply system employs a novel circuit which is not adversely affected by non-linear characteristics of the diode $D_1$. This novel circuit will now be described in detailed reference to the DC voltage generating circuit 2-1 in FIG. 4.

In FIG. 4, the cathode of the diode $D_1$ is connected to the voltage dividing point $P_1$ at which the DC voltage $+U_1$ appears that has been subdivided by employing the capacitors $C_1$ and $C_2$. The anode of the diode $D_1$ is connected via an amplifier (formed by an integrated circuit) $IC_1$ to another junction point 8-1 between the resistors $R_1$ and $R_2$, and to the RF voltage detection circuit 1. The other end of the resistor $R_1$ is connected to the cathode of the diode $D_1$ as well as the voltage dividing point $P_1$, whereas the other end of the resistor $R_2$ is grounded. The detected voltage $V_{REF}$ is applied to the positive polarity (+) terminal of the amplifier $IC_1$. That is to say, to this terminal, the voltage is applied which corresponds to the amplitudes of the RF voltages ±V cos ωt detected by the RF voltage detection circuit 1. The negative polarity (−) terminal of the amplifier $IC_1$ is grounded via the resistor $R_2$. As a result, this novel circuit constitutes a negative feedback path, so that the DC voltage $+U_1$ across the junction $P_1$ has a proportional relationship to the detected voltage $V_{REF}$ of the RF voltage detection circuit 1. As previously described, this proportional relationship between the DC voltage $+U_1$ and the detected voltage $V_{REF}$ is one of the features according to the invention.

Then, the produced DC voltage $+U_1$ is applied as a portion of the superimposed voltage (U+V cos ωt) through the choke coil $CH_1$ and the inductor $L_2$ to the electrodes 20 of the quadrupole mass spectrometer.

Figure 6:
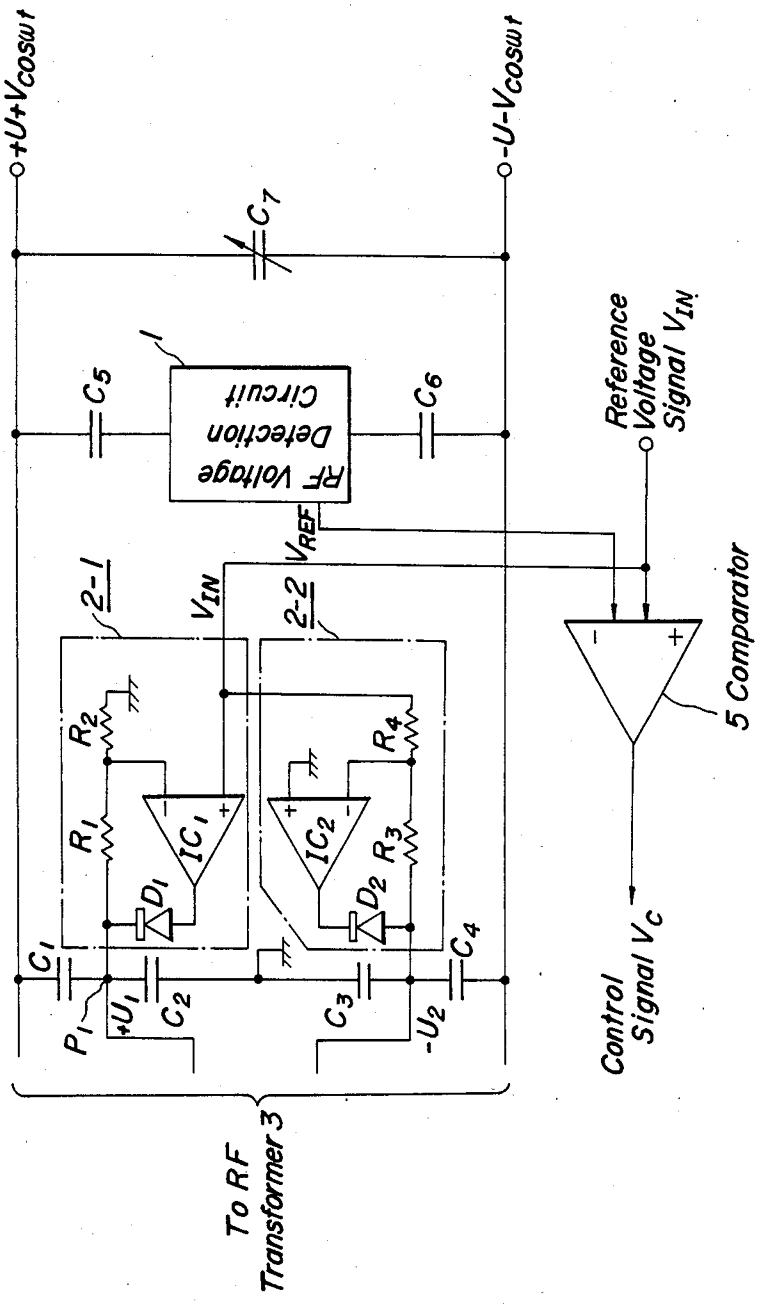
FIG. 6 is a schematic circuit diagram of the modified power supply system according to the first preferred embodiment.

Although the detected voltage $V_{REF}$ is applied to the positive polarity terminal of the amplifier $IC_1$ in FIG. 4, it is alternatively possible to apply the reference voltage signal $V_{IN}$ to the positive polarity terminal of the amplifier $IC_1$ as shown in FIG. 6. Since this reference voltage signal $V_{IN}$ indicates the magnitude of the RF voltages ±V cos ωt, the amplitude of the DC voltage $+U_1$ produced by the DC voltage generating circuit 2-1 necessarily corresponds to that of the RF voltage ±V cos ωt, with the result that there is a proportional relationship between the DC voltage $+U_1$ and the RF voltage ±V cos ωt.

According to the invention, another DC voltage −U2 can be similarly generated across the capacitor C3 by the DC voltage circuit 2-2 on the basis of the above-described proportional relationship. In the DC voltage circuit 2-2, $IC_2$ shows an amplifier, $D_2$ a diode, $R_3$ and $R_4$ resistors and 8-2 a junction point between resistors $R_3$ and $R_4$. The DC voltage −U2 is applied as a component of the superimposed supply voltage (−U−V cos ωt) via the choke coil $CH_2$ and the inductor $L_3$ forming the RF transformer 3 to the electrodes 20 of the quadrupole mass spectrometer.

SECOND EMBODIMENT

Figure 7:
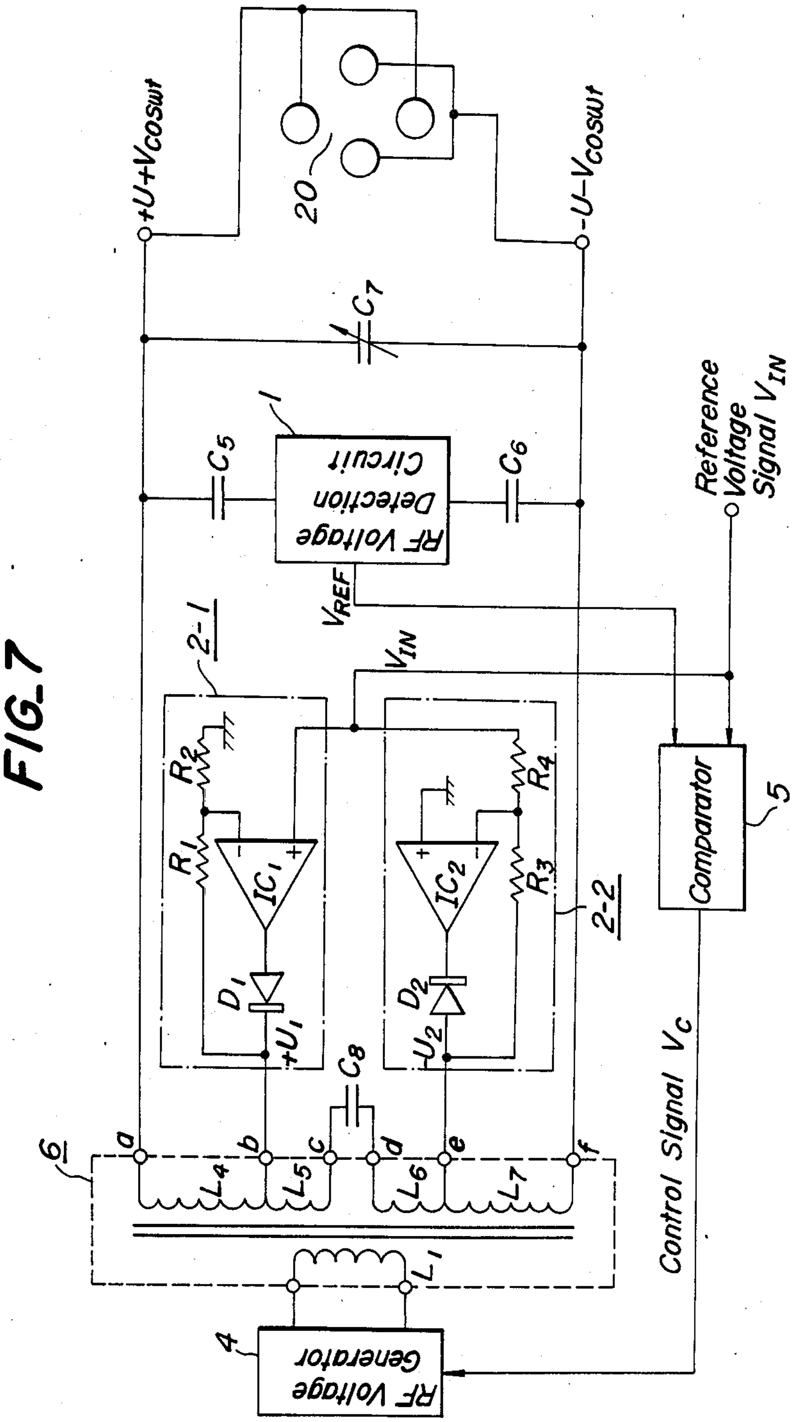
FIG. 7 is a schematic block diagram of a power supply system according to a second preferred embodiment.

Referring now to FIG. 7, a second embodiment of the power supply system will be described, As easily understood from the circuit shown most components of the circuit configuration in FIG. 7 are the same as that of the first embodiment shown in FIG. 4. Therefore the following description is made of only the different circuit portions.

In summary, RF (radio frequency) transformer 6 is provided instead of the RF transformer 3, this RF transformer 6 has taps in its secondary windings so as to divide the superimposed supply voltages ±(U+V cos ωt). The refernce characters $L_4$ and $L_5$ show inductor or coil portions between terminals "a and b" and "b and c" of the secondary winding, respectively, and also the reference characters $L_6$ and $L_7$ those between terminals "d and e" and "e and f" of another secondary winding, respsctively.

A detailed description will be followed. The first DC voltage generating circuit 2-1 is connected to the terminal "b" of the RF transformer 6, and also the capacitor C8 is connected between the terminals "c" and "d" thereof. As a result, one DC voltage +U1 is produced at the terminal "b". Similarly, as the other DC voltage generating circuit 2-2 is connected to the terminal "e" of the RF transformer 6, the other DC voltage −U2 appears from this terminal "e".

An important feature of this circuit is to eliminate the capacitors $C_1$ to $C_4$ for subdividing the RF voltages, and the choke coils $CH_1$ and $CH_2$. Moreover, since the reference voltage signal $V_{IN}$ is directly fed to the respective amplifiers $IC_1$ and $IC_2$ of the voltage generating circuits 2-1 and 2-2, the values of the generated DC voltages +U owe the proportional relationship to the reference input signal $V_{IN}$.

While the invention has been described in terms of certain preferred embodiments and exemplified with respect thereto, those skilled in the art will readily appreciate that various modification, changes, omissions, and substitutions may be made without detarting from the spirit of the invention.

For instance, the voltage $V_{REF}$ detected from the RF voltage detection circuit 1 may be directly applied to the DC voltage generating circuits 2-1 and 2-2 in the power supply system of FIG. 7. Accordingly, there still exists a proportional relationship between the values of the DC voltages (±U) and the amplitudes of the RF voltages (±V cos ωt).

The power supply system according to the invention is now summarized. The DC voltages +U are produced from the RF voltages ±V cos ωt while maintaining a specific relationship, i.e., a proportional relationship; and these voltages are superimposed with each other to obtain desirable superimposed voltages ±(U+V cos ωt) to be supplied to the electrodes of the quadrupole mass spectrometer. Consequently, there is no need to employ two sets of the separate power sources for the DC and RF voltages, resulting in a simpler power supply system.

What is claimed is:

1. A power supply system for a quadrupole mass spectrometer comprising:

means for generating RF (radio frequency) voltages;

means for dividing the RF voltages to produce subdivided RF voltages;

means for detecting the RF voltages to produce a detected voltage;

means for generating DC (direct current) voltages from the subdivided RF voltages obtained by said RF voltage dividing means, the subdivided RF voltages being rectified by the DC voltage generating means under control of the detected voltage while a proportional relationship is being maintained between the detected voltage and the resultant DC voltages; and means for superimposing the resultant DC voltages over the RF voltages, the superimposed voltages being applied to the quadrupole mass spectrometer.

2. A power supply system as claimed in claim 1, further comprising:

means for generating a reference voltage signal, the amplitude of the reference voltage signal corresponding to that of the detected voltage, whereby the reference voltage signal is supplied to the DC voltage generating means.

3. A power supply system as claimed in claim 1, wherein the RF voltage dividing means comprises a series-connected circuit of first and second capacitors, the subdivided RF voltages being produced at a junction of the series-connected circuit.

4. A power supply system as claimed in claim 1, wherein the DC voltage generating means comprises:

a rectifying diode electrically connected to the RF voltage dividing means for receiving the subdivided RF voltages so as to produce the DC voltages; and an operational amplifier electrically connected to the diode and the RF voltage detecting means for receiving the DC voltages and the detected voltage.

5. A power supply system as claimed in claim 2, wherein the DC voltage generating means comprises:

a rectifying diode electrically connected to the RF voltage dividing means for receiving the subdivided RF voltages so as to produce the DC voltages; and an operational amplifier electrically connected to the diode and the reference voltage signal generating means for receiving the DC voltages and the reference voltage signal.

6. A power supply system as claimed in claim 1, wherein the RF voltage dividing means comprises coil windings of secondary winding of an RF transformer, the primary winding of the RF transformer being connected to the RF voltage generating means.

* * * * *